H. NYE.
MOLD.
APPLICATION FILED FEB. 16, 1922.

1,435,020.  
Patented Nov. 7, 1922.

Inventor  
Harry Nye  
by his Attorneys

Patented Nov. 7, 1922.

1,435,020

UNITED STATES PATENT OFFICE.

HARRY NYE, OF AKRON, OHIO.

MOLD.

Application filed February 16, 1922. Serial No. 536,931.

*To all whom it may concern:*

Be it known that I, HARRY NYE, a citizen of the United States, and a resident of Akron, in the county of Summit and State of Ohio, have invented certain new and useful Improvements in a Mold, of which the following is a full, clear, and exact description.

My mold is particularly adapted for the manufacture of a ball such as described in my co-pending application Serial No. 528,610, filed Jan. 12, 1922, but may be used for other articles by a change in the form and dimensions of the mold members.

An object of my invention is the provision of a mold suitable for vulcanizing or curing articles containing a proportion of rubber, which will be simple to manufacture and efficient in operation.

Another object is to so arranged the parts that there will be a free circulation of steam through all parts so that the mold may be properly heated.

Another object is to provide a mold so constructed that one may be stacked on top of the other in a tire heater or similar device to the capacity thereof, and which will permit an efficient circulation of steam between the units thereof.

Other objects will be apparent from the following detailed description and the appended claims.

Figure 1:
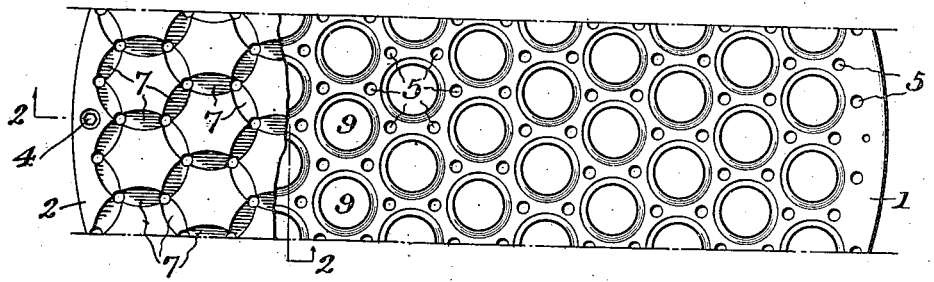
Figure 1 is a plan view of the device, the left hand part showing the cover plate in position.

Each unit of the mold consists of a main plate 1, which may be made of any desired shape or size. It is preferably circular and of a size to fit within a tire heater. Top and bottom members 2 and 3 are held in close contact therewith by a suitable number of bolts 4 when the device is assembled.

The main or central plate 1 has a plurality of cylindrical openings 8 passing therethrough in which fit the molds proper. Around each cylindrical opening 8 are arranged in hexagonal shape six openings 5 which extend through the plate 1.

The top and bottom plates 2 and 3 are of similar formation except turned to face oppositely. Each has openings 6 passing therethrough which register with the openings 5 in the central plate. A continuous passageway is therefore formed through the unit composed of the plates 1, 2 and 3.

Figure 3:
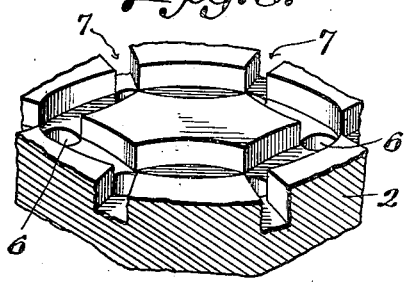
Figure 3 shows a perspective view of a portion of a top or bottom plate, particularly illustrating the steam passages.

Moreover, the top and bottom plates have on their outer surface passage ways 7 of the shape shown in Figures 1 and 3, which connect each opening 6 with the three nearest openings as shown.

Figure 2:
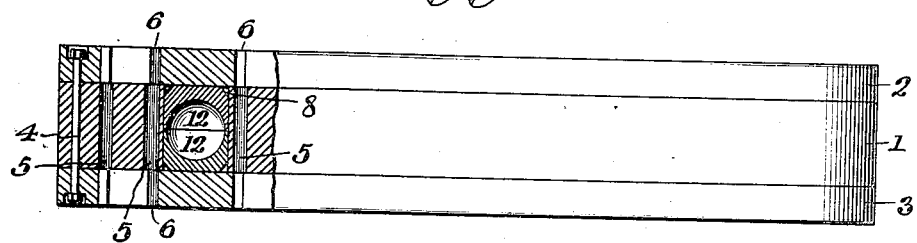
Figure 2 is in part a perspective view but showing a section on the line 2—2 of Figure 1.

The structure shown in Figure 2 constitutes a unit, and these units are to be stacked one above the other in a heater of suitable design. When so stacked the channels or passage ways 7 of one top plate register with the similar passageways in the bottom plate resting thereon. Also the passageways formed by the openings 5 and 6 extend from top to bottom of the stack. It is obvious that a very thorough circulation of steam is provided for and that it will pass close to the cylindrical openings 8 on all sides thereof.

Figure 4:
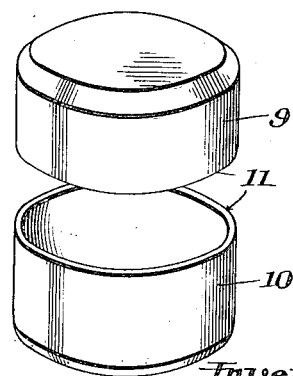
Figure 4 is a perspective view of the two semi-spherical members that inclose the ball.

In these cylindrical openings 8 are placed the molds proper, illustrated in Figure 4. Each of these elements 9 and 10 has a semi-cylindrical cavity 12 as clearly shown in Figure 2, and their meeting edges 11 are quite thin. Since these molds fit snugly within the cylinders 8 and the meeting edges are thin, there is no chance for the material composing the ball or its cover to be forced out between the edges or between the mold elements 9 and 10 and the cylinder 8.

In preparing each unit, the bottom 3 is first placed on a support and the central plate 1 placed upon it. The balls or other articles are placed in the mold elements 9 and 10 which are then placed in the cylinders 8. The top 2 is placed in position and all three parts fastened by means of the bolts 4. The unit is then placed within the heater. Obviously as many units may be stacked one upon the other as desired within the capacity of the heater.

Figure 5:
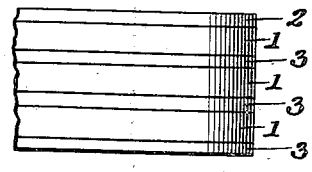
Figure 5 illustrates an alternative method of stacking the molds.

An alternative method of stacking the molds is shown in Figure 5. By this method the bottom section of one mold serves as the top section of the mold below, or vice versa. If for example, three main sections are used, the arrangement might be as illustrated in this figure, the two intermediate sections 3 serving both as top and bottom sections. Bolts 4 of any desired length may be employed. This permits a greater number of the main sections to be placed in a heater of given size, and obtains a greater efficiency in the use of the heating medium.

This mold while simple and cheap in construction causes a uniform cure of the balls and at the same time does not permit any steam to come into contact with the balls themselves.

It is obvious that by a change in the form of the openings 8 and a corresponding change in the form of the mold members 9 and 10, my device may be used to cure or vulcanize other articles with no further modification in its construction. Therefore, while especially adapted to the manufacture of balls, the invention is in no way limited thereto.

Details of form and material constitute no part of my invention except as they may be claimed.

I claim as my invention:

1. A mold comprising a central plate member having cylindrical openings therein and passageways for a heating medium arranged around said openings and parallel thereto, similar top and bottom plates having passageways adapted to register with those in the central plate and also having channels in their outer surfaces which connect each passageway with the adjacent one, semi-cylindrical mold members each having a semi-spherical cavity therein and adapted to fit in said cylindrical openings, and means for holding the three plates firmly together.

2. A mold comprising a central plate member having cylindrical openings therein, semi-cylindrical mold members each having a cavity therein and adapted to fit closely in the cylindrical openings, top and bottom plates to fit on either side of the central plate and retain the mold members in position, registering passageways through the three plates for the passage of a heating medium, and channels in the outer surfaces of the top and bottom plates communicating with said passageways.

3. A mold comprising a central plate member having openings therein, similar mold members adapted to fit closely within said openings, each mold member having a cavity therein, top and bottom plates that fit closely on either side of the central plate and retain the mold members in position, and means for permitting the circulation of a heating medium along the surface of the outer plates and through all of the plates.

4. A mold comprising a central plate member having openings therein, similar mold members adapted to fit closely within said openings, each mold member having a cavity and a thin edge where it engages its companion member, top and bottom plates on either side of the central plates which retain the mold members in position, means for holding the plates firmly together, and means for permitting the circulation of a heating medium along the surface and through the interior of the mold.

5. A mold comprising a central plate member having openings therein, mold members fitting within said openings, outer plate members, means for retaining all of the plate members together and holding the molds in position, and means for permitting the circulation of a heating medium on all sides of said mold members.

6. A mold unit comprising a central plate member, having openings therein, mold members fitting within said openings, outer plate members, means for holding said plate members firmly together and retaining the molds in position, passageways in the surfaces of the outer members for the circulation of a heating medium, the passageways of one unit registering with those of adjacent units when stacked one upon another.

7. A mold unit comprising a central plate member having openings therein, mold members fitting within said openings, outer plate members, pasageways through all plate members and passageways in the outer surfaces of the outer members for the circulation of a heating medium, all passageways of one unit registering with those of adjacent units when stacked one upon another.

8. A stack of molds comprising plate members having openings therein, mold members fitting within said openings, and alternating plate members, passageways through all of said plate members, and passageways in one surface of the alternating plate members, all of said passageways communicating and providing means for thorough circulation of a heating medium.

In testimony whereof, I have hereunto subscribed my name.

HARRY NYE.